US012508731B2

(12) United States Patent
Matsumura et al.

(10) Patent No.: US 12,508,731 B2
(45) Date of Patent: Dec. 30, 2025

(54) UNIT FOR CUTTING APPARATUS AND CUTTING APPARATUS

(71) Applicant: KYOCERA CORPORATION, Kyoto (JP)

(72) Inventors: Kazufumi Matsumura, Kagoshima (JP); Takashi Arashima, Kariya (JP); Kenji Kamei, Zhuhai (CN); Yasuhiro Yamamoto, Kyoto (JP); Takahiro Nishimura, Osaka (JP)

(73) Assignee: KYOCERA CORPORATION, Kyoto (JP)

( * ) Notice: Subject to any disclaimer, the term of this patent is extended or adjusted under 35 U.S.C. 154(b) by 248 days.

(21) Appl. No.: 18/554,995

(22) PCT Filed: Apr. 5, 2022

(86) PCT No.: PCT/JP2022/017081
§ 371 (c)(1),
(2) Date: Oct. 12, 2023

(87) PCT Pub. No.: WO2022/224813
PCT Pub. Date: Oct. 27, 2022

(65) Prior Publication Data

US 2024/0198552 A1 Jun. 20, 2024

(30) Foreign Application Priority Data

Apr. 19, 2021 (JP) ................................ 2021-070436

(51) Int. Cl.
*B26D 1/24* (2006.01)
*B26D 7/26* (2006.01)
*B65H 18/14* (2006.01)

(52) U.S. Cl.
CPC ........... *B26D 1/245* (2013.01); *B26D 7/2621* (2013.01); *B65H 18/145* (2013.01); *B65H 2301/4148* (2013.01)

(58) Field of Classification Search
CPC . B26D 1/24; B26D 1/245; B26D 7/26; B26D 7/2614; B26D 7/2621; B65H 18/14; B65H 18/145
See application file for complete search history.

(56) References Cited

U.S. PATENT DOCUMENTS 6,651,537 B1 * 11/2003 Pfeiffer .................. B65H 35/06 83/698.21
7,131,212 B1 * 11/2006 Kao ....................... B26D 1/305 33/286

(Continued)

FOREIGN PATENT DOCUMENTS

JP H01321197 A 12/1989
JP H04122488 U 11/1992
WO WO-2016114343 A1 * 7/2016 .............. B26D 1/14

*Primary Examiner* — Adam J Eiseman
*Assistant Examiner* — Richard D Crosby, Jr.
(74) *Attorney, Agent, or Firm* — HAUPTMAN HAM, LLP

(57) ABSTRACT

In a unit for a cutting apparatus, a first shaft, a second shaft, first blades and second blades individually have conductivity. A detection means includes a power source, a first wiring, a second wiring, a plurality of light emitting devices, a third wiring, and a fourth wiring. The first wiring electrically connects the first shaft and the power source. The second wiring electrically connects the second shaft and the power source. The plurality of light emitting devices are respectively attached to a plurality of holders. The third wiring electrically connects each of the plurality of light emitting devices and the first shaft. The fourth wiring electrically connects the plurality of light emitting devices and a plurality of the first blades respectively.

9 Claims, 10 Drawing Sheets

(56) References Cited

U.S. PATENT DOCUMENTS

| | | | | |
|---|---|---|---|---|
| 8,312,798 | B2 * | 11/2012 | Kwarta | B26D 1/185 83/508.3 |
| 10,272,583 | B2 * | 4/2019 | Oiwa | B26D 7/2621 |
| 11,904,492 | B2 * | 2/2024 | Lee | B26D 7/2635 |
| 2005/0217447 | A1 * | 10/2005 | Hollandsworth | B26D 7/2635 83/508.3 |
| 2008/0072728 | A1 * | 3/2008 | Oberheim | B27B 5/222 83/438 |
| 2011/0138982 | A1 * | 6/2011 | Block | B26D 7/27 83/520 |
| 2016/0068362 | A1 * | 3/2016 | Oyane | B65H 35/008 83/156 |
| 2019/0014956 | A1 * | 1/2019 | Chang | B26D 1/02 |
| 2020/0023483 | A1 * | 1/2020 | Beranek | B24B 49/003 |

* cited by examiner

UNIT FOR CUTTING APPARATUS AND CUTTING APPARATUS

CROSS-REFERENCE TO RELATED APPLICATION

This application is a national stage entry according to 35 U.S.C. 371 of PCT Application No. PCT/JP2022/017081 filed on Apr. 5, 2022, which claims priority to Japanese Patent Application No. 2021-070436, filed Apr. 19, 2021. The contents of this application are incorporated herein by reference in their entirety.

TECHNICAL FIELD

The present disclosure relates to a unit used for a cutting apparatus that cuts a member having a sheet shape in a predetermined width. Examples of the member having the sheet shape may include members, such as metal foils, papers, and resin films.

BACKGROUND

For example, slitter apparatuses discussed in Japanese Unexamined Patent Application Publication No. 1-321197 (Patent Document 1) and Japanese Unexamined Utility Model Application Publication No. 4-122488 (Patent Document 2) are known as a cutting apparatus that cuts down a member having a sheet shape. The slitter apparatus discussed in Patent Document 1 includes a plurality of blades having a ring shape, and a plurality of lamps electrically connected to the plurality of blades respectively. The slitter apparatus discussed in Patent Document 2 also includes a plurality of thin blades having a ring shape, and a plurality of light emitting devices electrically connected to the plurality of thin blades respectively. In both slitter apparatuses discussed in Patent Documents 1 and 2, the lamps (light emitting devices) are used to detect a contact state of the blades (thin blades).

In both slitter apparatuses discussed in Patent Documents 1 and 2, the lamps are attached to an apparatus body. When cutting down the member having the sheet shape, the number and position of the blades may be changed in order to obtain a cut piece with a desired width. Hence it may be difficult to understand a corresponding relationship between the lamps and the blades.

SUMMARY

A unit in a non-limiting embodiment of the present disclosure includes a base, a first shaft, a plurality of holders, a plurality of first blades, a second shaft, a plurality of second blades, and a detection means. The first shaft is attached to the base and extends along a first rotation axis. The plurality of holders having a cylindrical shape are attached to the first shaft. The plurality of first blades having an annular shape are respectively attached to the plurality of holders. The second shaft is attached to the base and extends along a second rotation axis parallel to the first rotation axis. The plurality of second blades having a cylindrical shape are attached to the second shaft. The detection means detects contacts between the plurality of first blades and the plurality of second blades.

The first shaft, the second shaft, the first blades, and the second blades individually have conductivity. The detection means includes a power source, a first wiring, a second wiring, a plurality of light emitting devices, a third wiring, and a fourth wiring. The first wiring electrically connects the first shaft and the power source. The second wiring electrically connects the second shaft and the power source. The plurality of light emitting devices are respectively attached to the plurality of holders. The third wiring electrically connects each of the plurality of light emitting devices and the first shaft. The fourth wiring electrically connects the plurality of light emitting devices and the plurality of first blades respectively.

EMBODIMENTS

<Unit for Cutting Apparatus>

Figure 1:
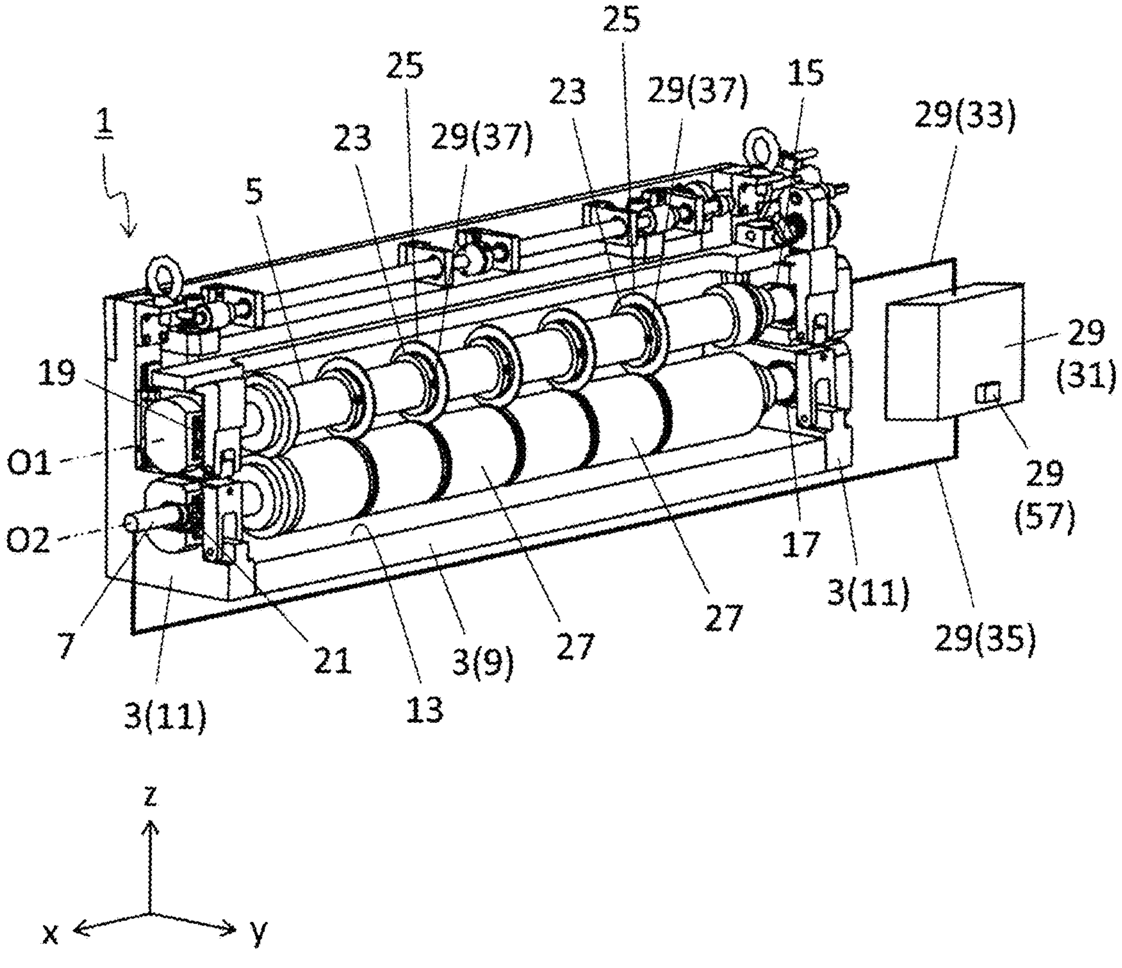
FIG. 1 is a perspective view illustrating a unit in a non-limiting embodiment of the present disclosure.
Figure 2:
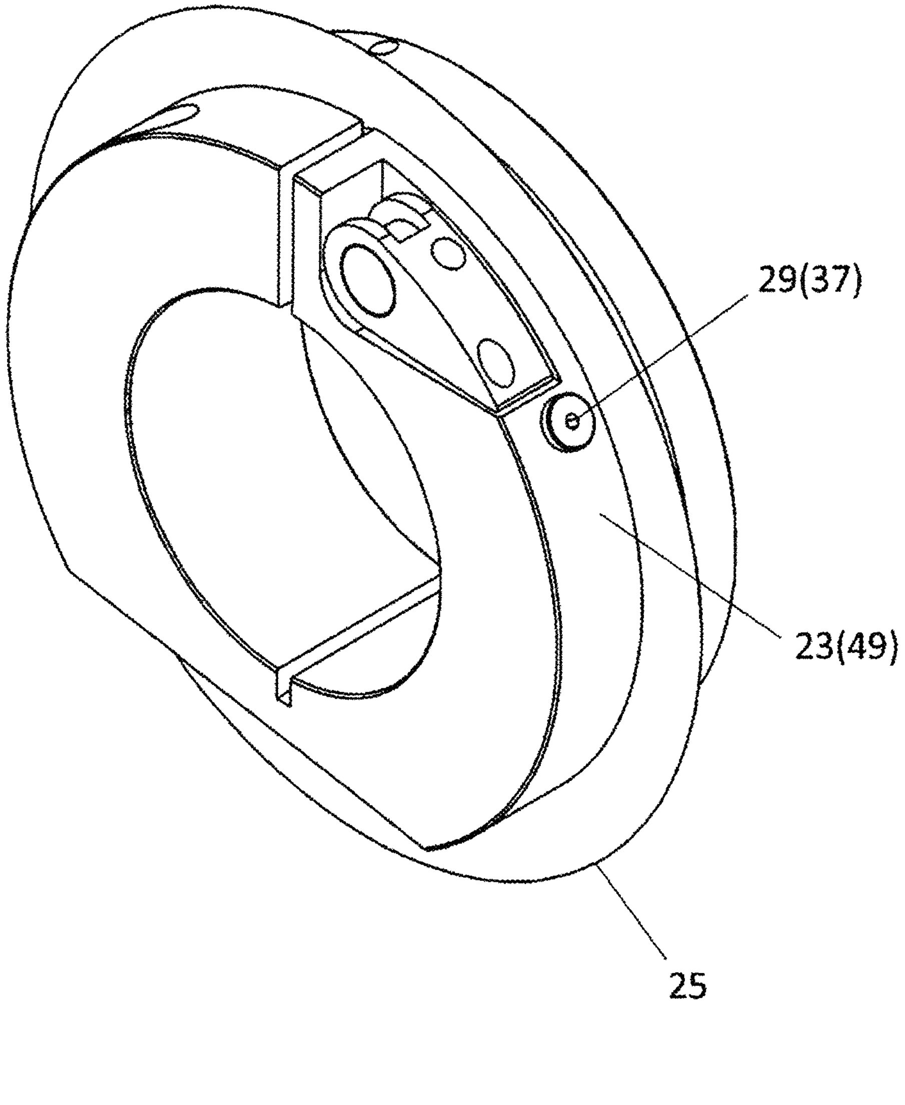
FIG. 2 is a perspective view of a holder and a first blade in the unit for the cutting apparatus illustrated in FIG. 1.

A unit for a cutting apparatus 1 in a non-limiting embodiment of the present disclosure (hereinafter also referred to as "a unit 1") is described in detail below with reference to the drawings. For the convenience of description, the drawings referred to in the following illustrate, in simplified form, only main members necessary for describing the embodiments. The unit 1 may therefore include any arbitrary structural member not illustrated in the drawings referred to. Dimensions of the members in each of the drawings faithfully represent neither dimensions of actual structural members nor dimensional ratios of these members.

The unit 1 may include a base 3, a first shaft 5, and a second shaft 7 as in a non-limiting embodiment illustrated in FIG. 1.

The first shaft 5 may be attached to the base 3. The first shaft 5 may be detachably attached to the base 3. The first shaft 5 may extend along a first rotation axis O1. The first shaft 5 is rotatable around the first rotation axis O1.

The first shaft 5 is not limited to one which has specific dimensions. For example, a length of the first shaft 5 in a direction along the first rotation axis O1 may be set to approximately 300-4000 mm. A width (diameter) of the first shaft 5 in a direction orthogonal to the first rotation axis O1 may be set to approximately 30-150 mm. A cross section orthogonal to the first rotation axis O1 in the first shaft 5 may have a circular shape.

The second shaft 7 may be attached to the base 3. The second shaft 7 may be detachably attached to the base 3. The second shaft 7 may extend along a second rotation axis O2. The second shaft 7 is rotatable around the second rotation axis O2.

The second shaft 7 is located below the first shaft 5. The second shaft 7 is rotatable in an opposite direction of the first shaft 5. For example, in cases where gears to be engaged on the first shaft 5 and the second shaft 7 are respectively attached thereto, if the first shaft 5 is rotated, the second shaft 7 is rotatable in the opposite direction of the first shaft 5 according to the rotation of the first shaft 5.

The second rotation axis O2 may be parallel to the first rotation axis O1. The term "parallel" as used herein is not limited to be a strict parallel, but may mean that it allows for an inclination of approximately ±5°. The second rotation axis O2 may be overlapped with the first rotation axis O1 in plan view of the unit 1 from a side of the first shaft 5.

The second shaft 7 is not limited to one which has specific dimensions. For example, a length of the second shaft 7 in a direction along the second rotation axis O2 may be set to approximately 300-4000 mm. A width (diameter) of the second shaft 7 in a direction orthogonal to the second rotation axis O2 may be set to approximately 30-150 mm. A cross section of the second shaft 7 orthogonal to the second rotation axis O2 may have a circular shape.

The base 3 may include a lower plate part 9 and a pair of sidewall parts 11 fixed to the lower plate part 9 with their respective main surfaces opposed to each other. The lower plate part 9 may include an upper surface 13 having a rectangular shape. The pair of sidewall parts 11 may be fixed to the lower plate part 9 along a short side in the upper surface 13. The first shaft 5 and the second shaft 7 may be located parallel to the upper surface 13 of the lower plate part 9.

The lower plate part 9 is not limited to one which has specific dimensions. For example, a width of the lower plate part 9 in x-axis direction in the non-limiting embodiment illustrated in FIG. 1 may be set to approximately 400-5000 mm. A width of the lower plate part 9 in y-axis direction may be set to approximately 100-500 mm. A width of the lower plate part 9 in z-axis direction may be set to approximately 200-500 mm.

In the non-limiting embodiment illustrated in FIG. 1, the direction parallel to the first rotation axis O1 and the second rotation axis O2 is the x-axis direction, and the direction orthogonal to the x-axis direction and parallel to the upper surface 13 of the lower plate part 9 is the y-axis direction. The direction that is a vertical direction in FIG. 1 and is orthogonal to the x-axis direction and the y-axis direction is the z-axis direction.

The pair of sidewall parts 11 may individually include a first support part 15 and a second support 17 which are independent of each other.

The first support part 15 is configured to permit attachment of the first shaft 5. The unit 1 may include a pair of first bearings 19 respectively attached to opposite end portions of the first shaft 5. The first shaft 5 may be attached to the first support part 15 by holding the first bearings 19 with the first support part 15. In these cases, it is easy to rotate the first shaft 5 while stably holding the first shaft 5 with the first support part 15.

Examples of the first bearings 19 may include a bearing having an annular shape. The bearing is not limited to one which has specific dimensions. For example, an outer diameter of the bearing may be set to approximately 30-150 mm. This is also true for a bearing in a second bearings 21 described later.

The second support part 17 may be located below the first support part 15. The second support part 17 is configured to permit attachment of the second shaft 7. The unit 1 may include a pair of second bearings 21 attached to opposite end portions of the second shaft 7. The second shaft 7 may be attached to the second support part 17 by holding the second bearings 21 with the second support part 17. In these cases, it is easy to rotate the second shaft 7 while stably holding the second shaft 7 with the second support part 17. Examples of the second bearings 21 may include a bearing having an annular shape.

The pair of sidewall parts 11 are not limited to one which has specific dimensions. For example, a width of the sidewall parts 11 in the x-axis direction may be set to approximately 10-60 mm. A width of the sidewall parts 11 in the y-axis direction may be set to approximately 100-500 mm. A width of the sidewall parts 11 in the z-axis direction may be set to approximately 200-500 mm.

The base 3 may be configured to have strength sufficient for stably holding the first shaft 5 and the second shaft 7. Therefore, the base 3 is not limited to a structure formed by the lower plate part 9 and the pair of sidewall parts 11. For example, the base 3 may be a structure having such a concave shape that the lower plate part 9 and the pair of sidewall parts 11 are formed integrally. Examples of material of the base 3 may include steel and stainless steel.

The unit 1 may include a plurality of holders 23. The plurality of holders 23 may have a cylindrical shape. The plurality of holders 23 may be individually attached to the first shaft 5. The plurality of holders 23 may be individually detachably attached to the first shaft 5.

The holders 23 adjacent to each other may be kept in contact with each other or separated from each other.

The number of the holders 23 may be 2 to 30. The holders 23 may be a member for fixing first blades 25 described below to the first shaft 5.

The unit 1 may include a plurality of first blades 25. The plurality of first blades 25 may have an annular shape. The plurality of first blades 25 may be respectively attached to the plurality of holders 23. The plurality of first blades 25 may be respectively detachably attached to the plurality of holders 23.

The number of the first blades 25 may be 2 to 30. The number of the first blades 25 may be equal to the number of the holders 23. The first blades 25 may be members having a disk shape or dish shape. The first blades 25 may also be called circular blades.

In cases where the plurality of holders 23 are individually attached to the first shaft 5, and the plurality of first blades 25 are respectively attached to the plurality of holders 23, the plurality of first blades 25 are respectively fixable to the first shaft 5 with the holders 23 interposed therebetween.

Consequently, during rotation of the first shaft 5, the plurality of first blade members 25 are also rotatable according to the rotation of the first shaft member 5. Additionally, upon adjustment of spacing between the holders 23 adjacent to each other, spacing between the first blades 25 adjacent to each other is also adjustable accordingly.

The unit 1 may include a plurality of second blades 27. The plurality of second blades 27 may have a cylindrical shape. The plurality of second blades 27 may be individually attached to the second shaft member 7. The plurality of second blades 27 may be individually detachably attached to the second shaft 7. If the plurality of second blades 27 are individually attached to the second shaft 7, the plurality of second blades 27 are also individually rotatable according to the rotation of the second shaft 7. The number of the second blades 27 may be 2 to 30.

The plurality of second blades 27 may be individually attached to the second shaft 7 so that lateral surfaces of the plurality of second blades 27 can respectively come into contact with lateral surfaces of the plurality of first blades 25. In this case, due to contacts between the lateral surfaces of the first blades 25 which are relatively susceptible to elastic deformation, and the lateral surfaces of the second blades 27 which are relatively less susceptible to elastic deformation, shear force may occur between the first blades 25 and the second blades 27. Then it becomes possible to cut down a member having a sheet shape by the sear force. Thus, a member having the sheet shape and a relatively large width which is fed to the unit 1 can be cut down into a sheet processed product (cut piece) having a relatively small width by the plurality of first blades 25 and the plurality of second blades 27.

The first shaft 5, the second shaft 7, the first blades 25, and the second blades 27 may have conductivity. For example, the first shaft 5, the second shaft 7, the first blades 25, and the second blades 27 may be made of a material having conductivity. Examples of the material having conductivity may include copper, steel, stainless steel and aluminum.

A surface of each of the first shaft 5, the second shaft 7, the first blades 25, and the second blades 27 may have conductivity. For example, the first shaft 5, the second shaft 7, the first blades 25, and the second blades 27 may be configured to include a base having insulation properties and a coating film that is located on the base and has conductivity.

Examples of material of the base having insulation properties may include resin, ceramics, and DLC (Diamond Like Carbon). Examples of resin may include polyethylene, polypropylene, polystyrene, and polyvinyl chloride. Examples of ceramics may include alumina ($Al_2O_3$), zirconia ($ZrO_2$), aluminum nitride (AlN), silicon carbide (SiC), and silicon nitride ($Si_3N_4$). Examples of the material of the coating film having conductivity may include Ti-based coating containing Ti. Examples of the Ti-based coating may include TiN, TiC, TiCN, TiAlN, TiAlCN, and TiAlON. The coating film having conductivity may be rephrased as a conductive film. The coating film may be located on the base by using chemical vapor deposition (CVD) method or physical vapor deposition (PVD) method.

At least one of the first shaft 5, the second shaft 7, the first blades 25, and the second blades 27 may be made of a material having conductivity, and the rest may be configured to include a base having insulation properties, and a coating film that is located on the base and has conductivity.

The unit 1 may include a detection means 29 for detecting contacts between the plurality of first blades 25 and the plurality of second blades 27. As in the non-limiting embodiment illustrated in FIGS. 1 to 9, the detection means 29 may include a power source 31, a first wiring 33, a second wiring 35, a light emitting device 37, a third wiring 39, and a fourth wiring 41.

The first wiring 33 may electrically connect the first shaft 5 and the power source 31. The second wiring 35 may electrically connect the second shaft 7 and the power source 31. There may be a plurality of light emitting devices 37. The plurality of light emitting devices 37 may be respectively attached to the plurality of holders 23. The third wiring 39 may electrically connect each of the plurality of light emitting devices 37 and the first shaft 5. The fourth wiring 41 may electrically connect the plurality of light emitting devices 37 and the plurality of first bladed 25, respectively.

In these cases, the plurality of light emitting devices 37 are respectively attached to the plurality of holders 23, instead of the base 3. Therefore, it is easy to understand a corresponding relationship between the light emitting devices 37 and the first blades 25 even with a change in the number and positions of the plurality of first blades 25.

The plurality of light emitting devices 37 are individually capable of emitting light in the non-limiting embodiment. This enables an individual detection of individually detecting the presence or absence of contacts in the plurality of first blades 25 and the plurality of second blades 27, instead of a collective detection of collectively detecting the presence or absence of the contacts. Therefore, it is easy to efficiently detect the presence or absence of the contacts in the plurality of first blades 25 and the plurality of second blades 27, and it is easy to avoid occurrence of poor cutting.

Examples of the light emitting devices 37 may include lamps. The number of the light emitting devices 37 may be 2 to 30. The number of the light emitting devices 37 may be equal to the number of the holders 23.

The holders 23 may have insulation properties. In this case, the holders 23 are less likely to electrically shorted with the first shaft 5, and it is easy to form the third wiring 39. For example, the holders 23 may be made of a material having insulation properties. Examples of the material having insulation properties may include the same materials as those exemplified in the base having insulation properties.

The surfaces of the holders 23 may have insulation properties. For example, each of the holders 23 may include a main body 43 having a cylindrical shape, an inner circumferential surface 45 of the main body 43, and a coating film 47 located on the inner circumferential surface 45 as in the non-limiting embodiment illustrated in FIG. 8. The main body 43 of the holder 23 may have conductivity, and the coating film 47 may have insulation properties.

Examples of material of the main body 43 may include the same materials as those exemplified in the first shaft 5 and the like. Examples of material of the coating film 47 having insulation properties may include resins, ceramics, and DLC (Diamond Like Carbon). The coating film 47 having insulation properties may also be located on other surface in the main body 43 in addition to the inner circumferential surface 45. The coating film 47 having insulation properties may be rephrased as an insulating film.

Figure 3:
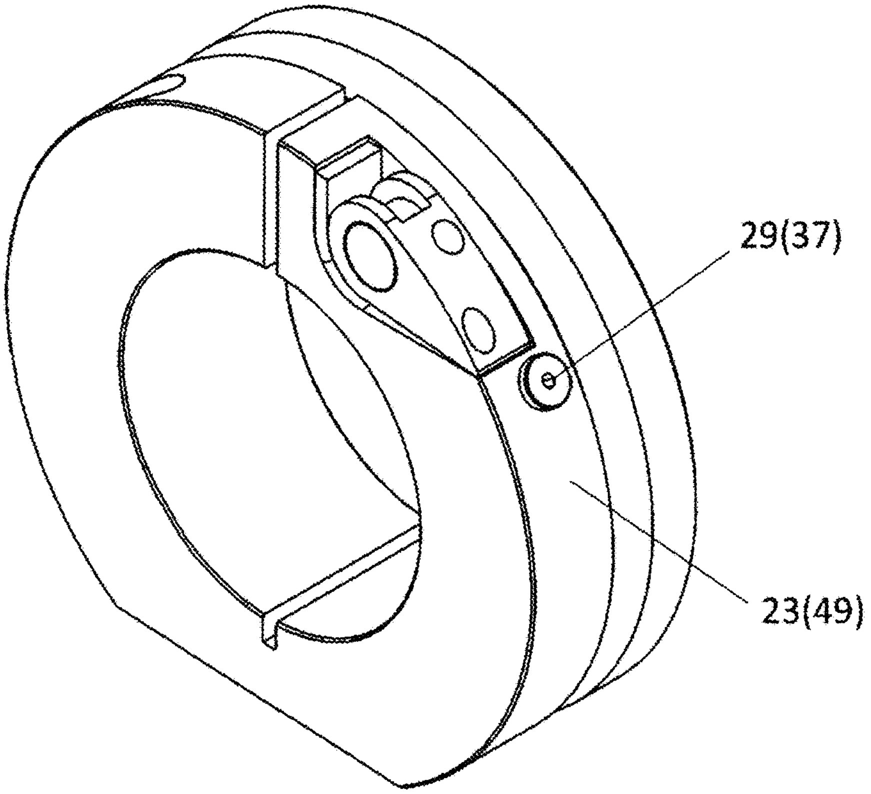
FIG. 3 is a perspective view of the holder in the unit for the cutting apparatus illustrated in FIG. 1.
Figure 4:
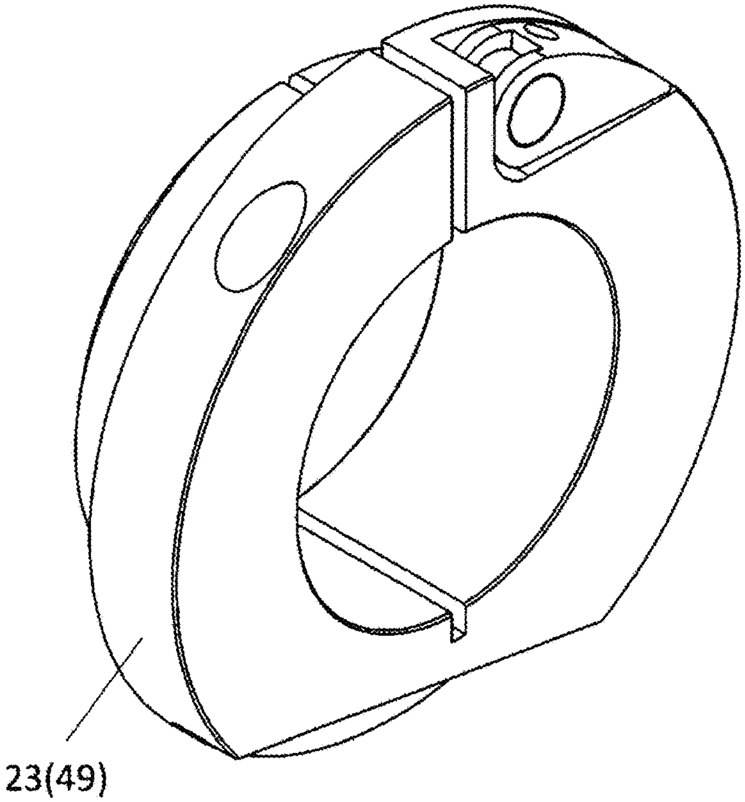
FIG. 4 is a perspective view of the holder illustrated in FIG. 3 as viewed from a different direction.
Figure 5:
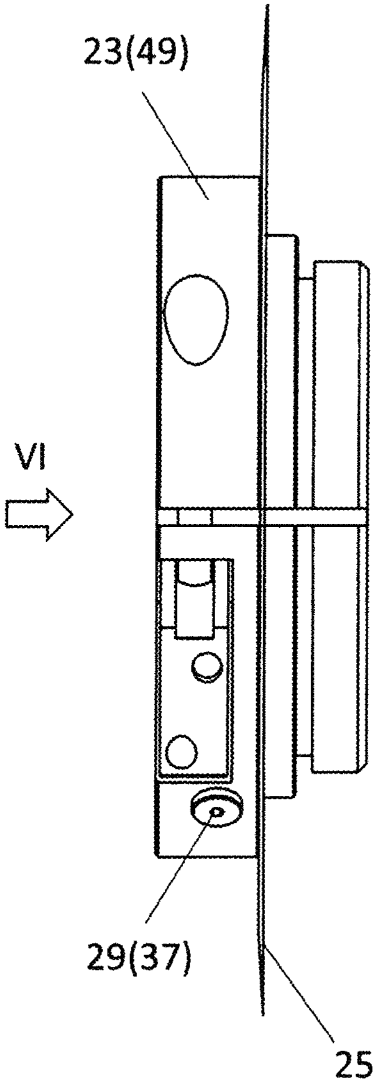
FIG. 5 is a diagram of the holder and the first blade in the unit for the cutting apparatus illustrated in FIG. 1 as viewed from a direction vertical to an outer circumferential surface of the holder.
Figure 6:
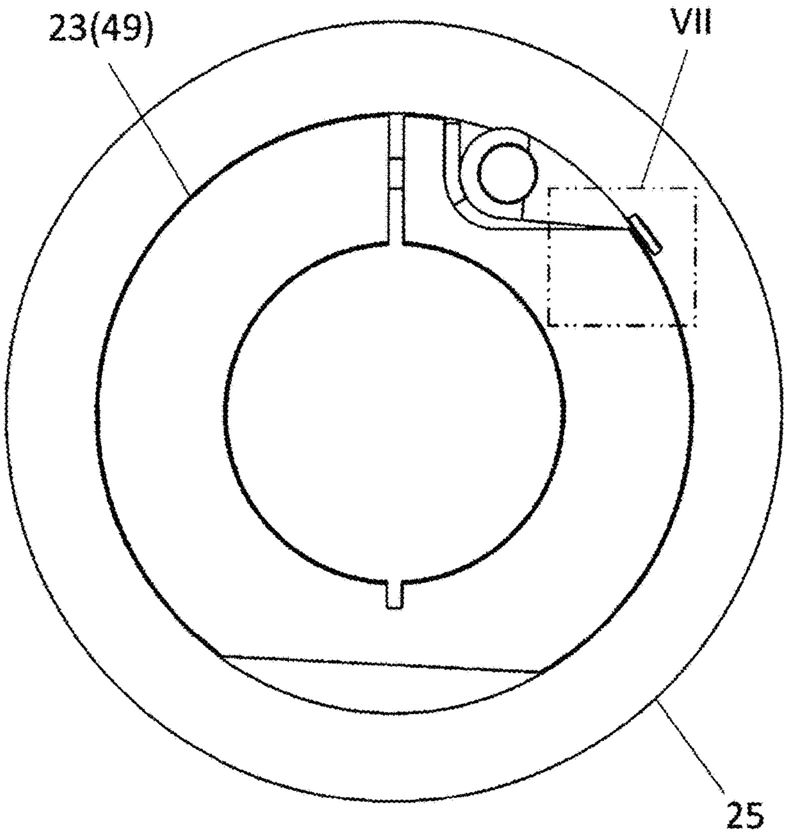
FIG. 6 is a plan view of the holder and the first blade illustrated in FIG. 5 as viewed from a direction of VI.
Figure 7:
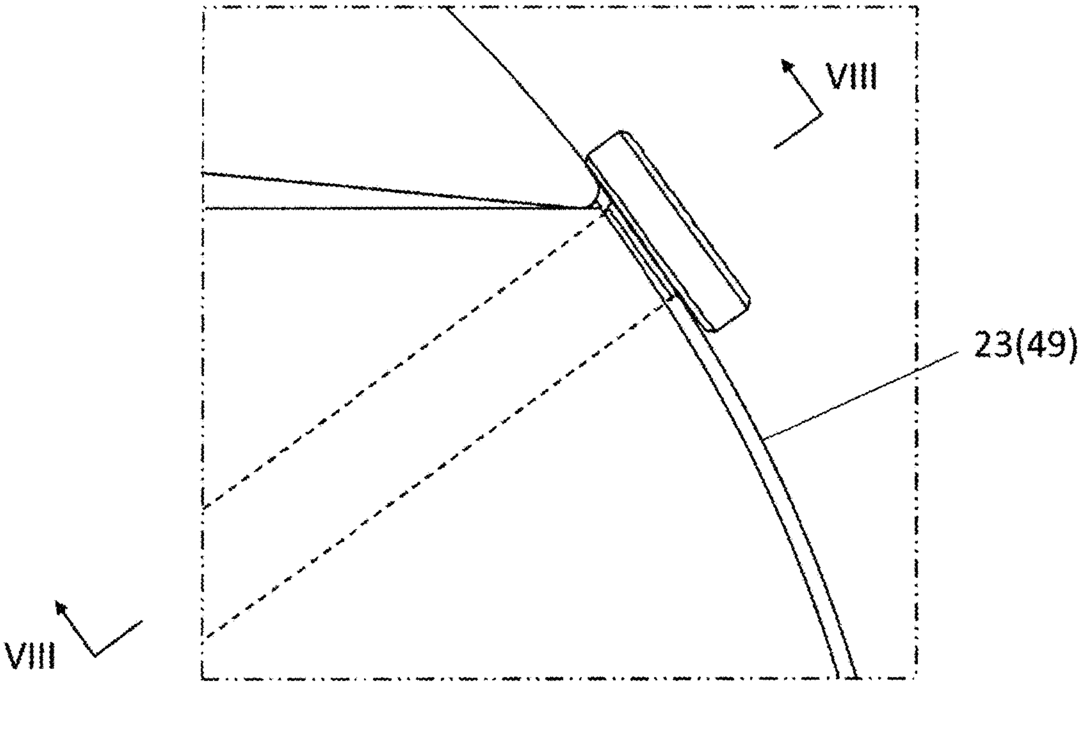
FIG. 7 is an enlarged view of a region VII illustrated in FIG. 6.
Figure 8:
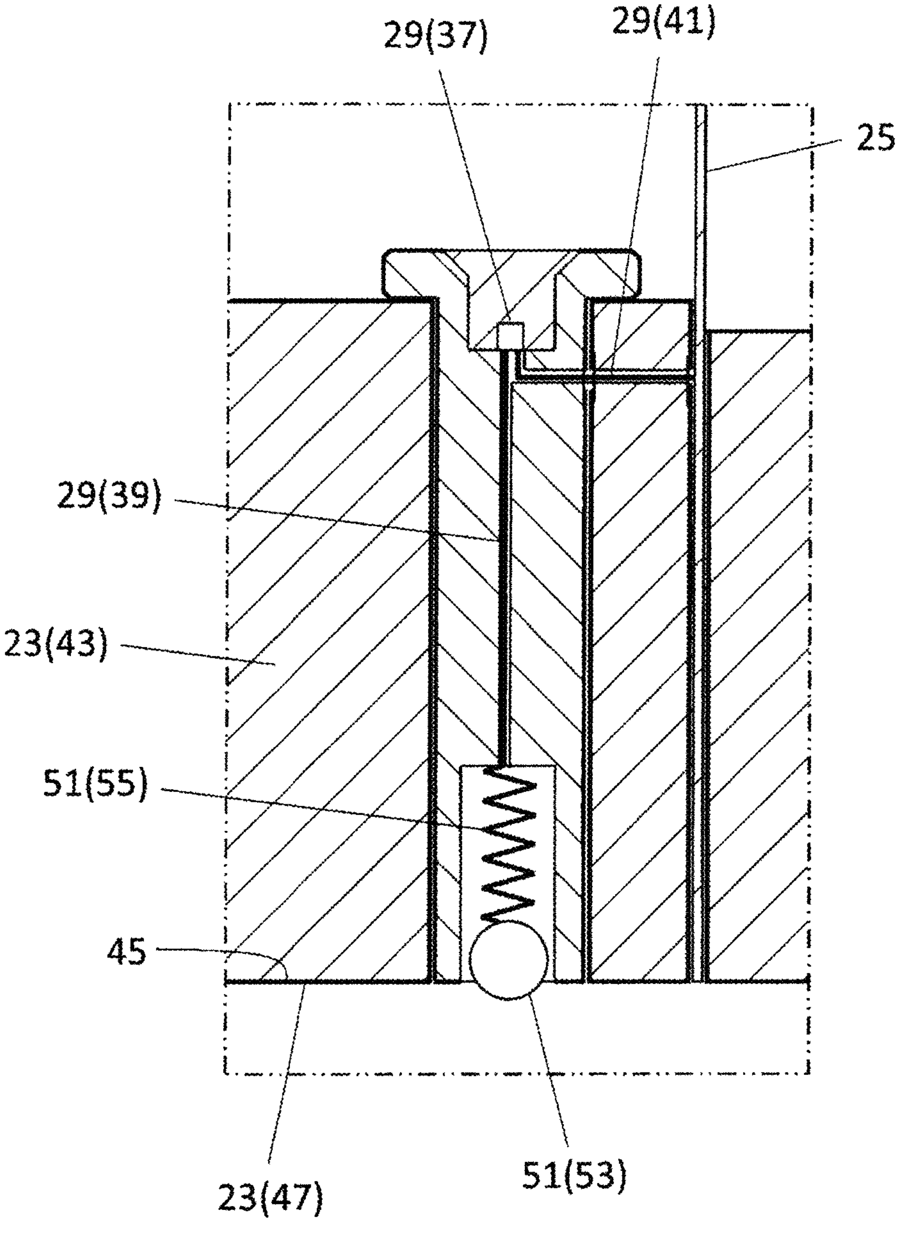
FIG. 8 is a sectional view taken along line VIII-VIII illustrated in FIG. 7.

Each of the holders 23 may include an outer circumferential surface 49 as in the non-limiting embodiment illustrated in FIG. 3. In other words, the main body 43 of the holder 23 may include the outer circumferential surface 49. The light emitting device 37 may be attached to the outer circumferential surface 49. This facilitates a visual observation of the light emitting device 37.

Figure 9:
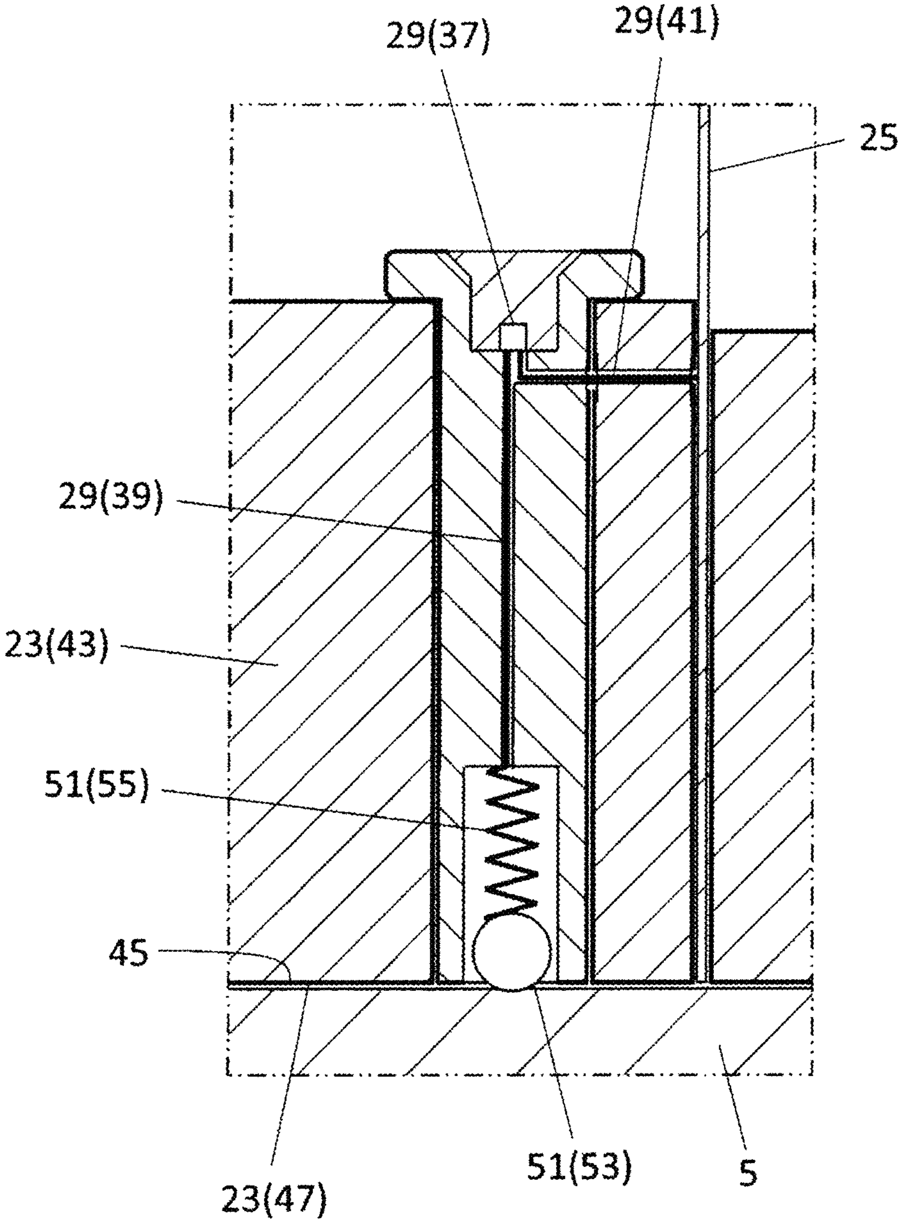
FIG. 9 is a diagram where a first shaft is added to the sectional view illustrated in FIG. 8.

The third wiring 39 may include a ball plunger 51 contactable with the first shaft 5 as in the non-limited embodiment illustrated in FIG. 9. This facilitates a point contact with the first shaft 5 (shaft).

The ball plunger 51 may have conductivity. The ball plunger 51 may include a ball 53 contactable with the first shaft 5, and an energizing means 55 for energizing the ball 53 toward the first shaft 5. Examples of the energizing means 55 may include a spring.

The plurality of light emitting devices 37 may be arranged in a row along the first rotation axis O1 as in the non-limiting embodiment illustrated in FIG. 1. This facilitates a visual observation of the light emitting devices 37.

The detection means 29 may include a switch 57. The switch 57 is capable of performing on-off control of a current flow. If the detection means 29 includes the switch 57, activation becomes possible only when it is desired to check a blade position. The position of the switch 57 is not particularly limited as long as the switch 57 serves its function.

Figure 10:
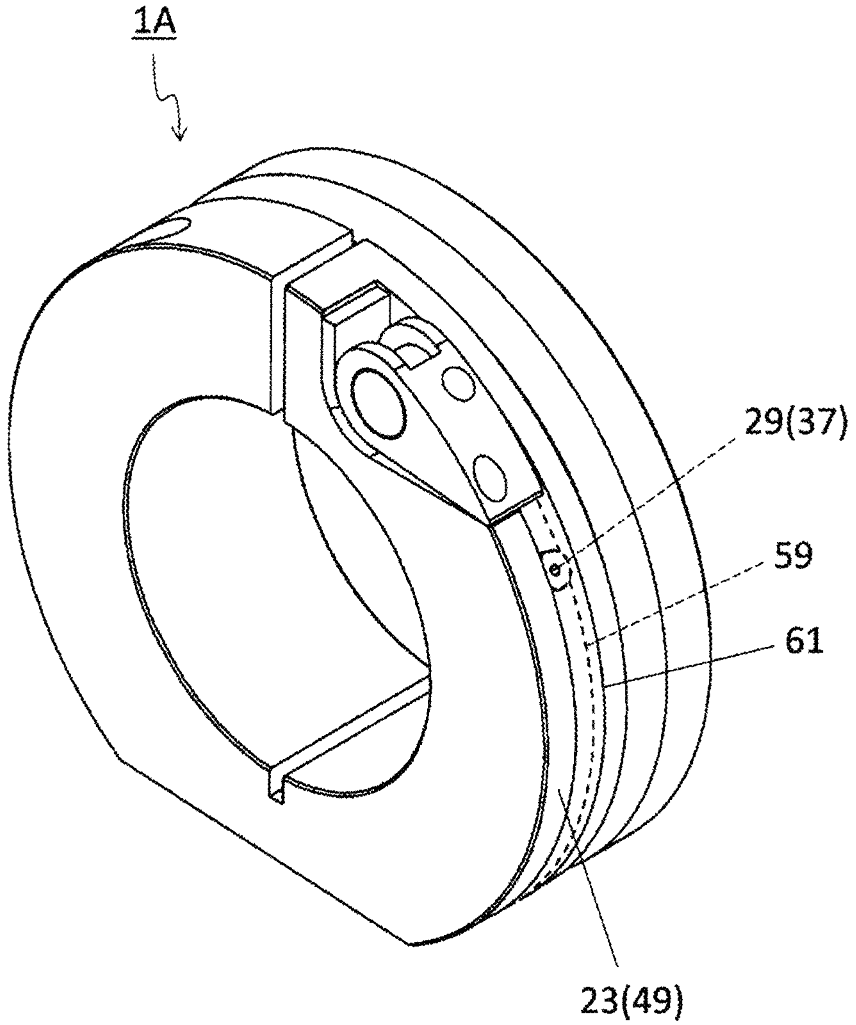
FIG. 10 is a perspective view illustrating a holder of a unit in a non-limiting embodiment of the present disclosure, specifically a diagram corresponding to FIG. 3.
Figure 11:
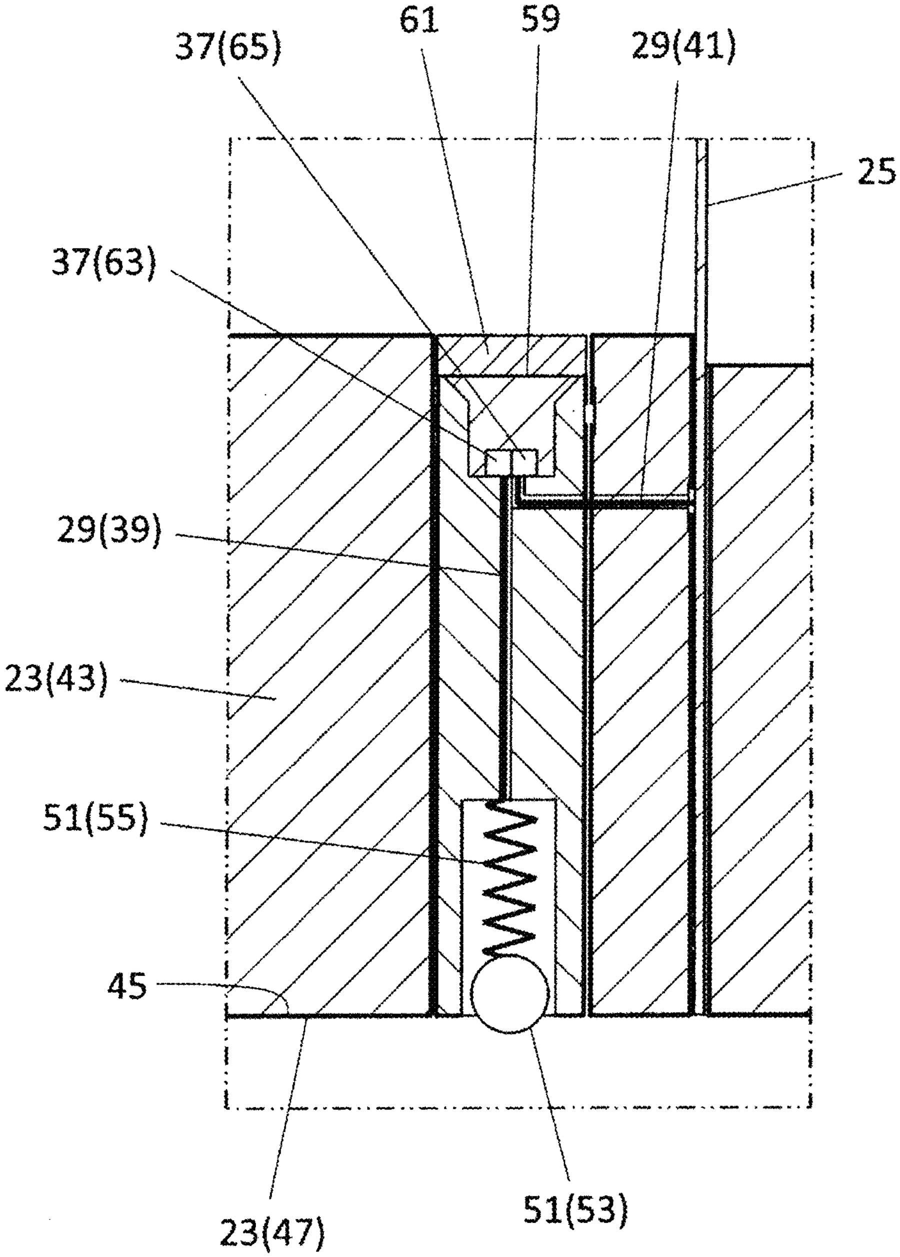
FIG. 11 is a sectional view of the holder illustrated in FIG. 10, specifically a diagram corresponding to FIG. 8.

A unit for cutting device 1A (hereinafter also referred to as "a unit 1A") in a non-limiting embodiment of the present disclosure is described below with reference to FIGS. 10 and 11. The following is focused on differences of the unit 1A from the unit 1, and a detailed description of a component having a similar configuration to the unit 1 may be omitted in some cases.

Each of the holders 23 in the unit 1A may include a concave part 59 having an annular shape located on the outer circumferential surface 49. Each of light emitting devices 37 may be attached to the concave part 59. In these cases, the light emitting devices 37 are less prone to damage. The concave part 59 may be rephrased as a groove.

The unit 1A may further include a translucent member 61. The translucent member 61 may be attached to the concave part 59. The translucent member 61 may have an annular shape covering the light emitting device 37. In this case, the light emitting device 37 is less prone to damage.

Examples of material of the translucent member 61 may include glass and translucent resin. Examples of the translucent resin may include PMMA (PolyMethyl MethAcrylate:acryl) resin, PET (PolyEthylene Terephthalate:polyethylene terephthalate) resin, and PC (PolyCarbonate: polycarbonate) resin. Translucency in the translucent member 61 may be the degree to which the light emitting device 37 can be visually observed through the translucent member 61.

The plurality of light emitting devices 37 may individually include a first light emitting element 63 and a second light emitting element 65. The second light emitting element 65 may emit light of a color different from that of the first light emitting element 63. In these cases, it becomes possible to separately display purposes and positional relationship of a cutting tool located at a cutting portion.

<Cutting Apparatus>

A cutting apparatus 101 in a non-limiting embodiment of the present disclosure is described in detail below with reference to FIG. 12 by exemplifying the case of including the unit 1.

Figure 12:
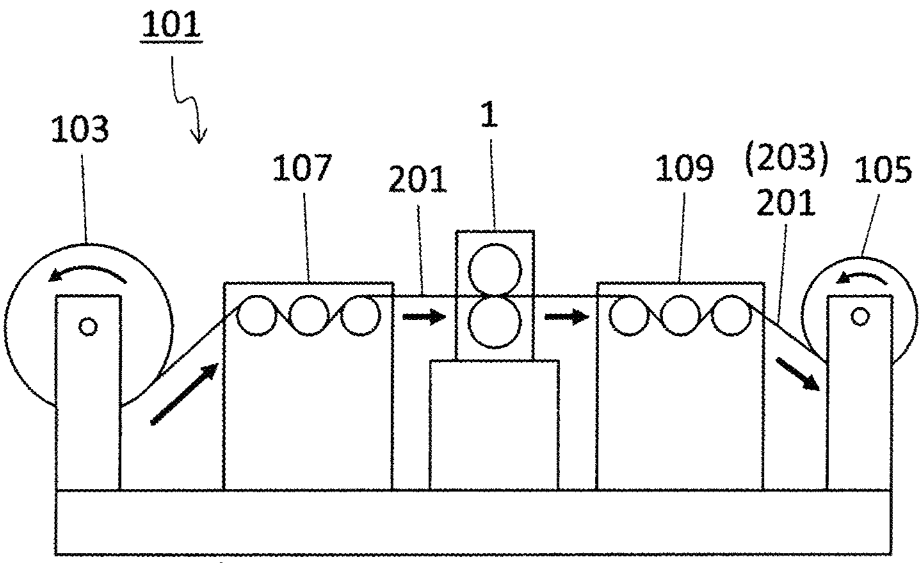
FIG. 12 is a schematic diagram illustrating a cutting apparatus in a non-limiting embodiment of the present disclosure.

The cutting apparatus 101 may include the unit 1, a first roll 103, and a second roll 105 as in the non-limiting embodiment illustrated in FIG. 12. If the cutting apparatus 101 includes the unit 1, poor cutting is less likely to occur.

A sheet-shaped member 201 may be wound around the first roll 103, and the first roll 103 may feed the sheet-shaped member 201 to the unit 1. The first roll 103 is servable as a supply mechanism for supplying the sheet-shaped member 201 to the unit 1. When using the cutting apparatus 101, the sheet-shaped member 201 wound around the first roll 103 may be fed to the unit 1 by rotation of the first roll 103.

The second roll 105 may take up the sheet-shaped member 201 cut down by the unit 1. The second roll 105 is servable as a take-up mechanism for taking up the sheet-shaped member 201 cut down by the unit 1.

There may be one or a plurality of second rolls 105. If there is the single second roll 105, the sheet-shaped member 201 cut down into individual pieces by the unit 1 may be collectively taken up by the single second roll 105. If there are the plurality of second rolls 105, the sheet-shaped member 201 cut down into individual pieces by the unit 1 may be respectively taken up by the plurality of second rolls 105. The sheet-shaped member 201 cut down into the individual pieces by the unit 1 may be rephrased as sheet processed products 203.

The cutting apparatus 101 may include a first guide roll 107 located between the unit 1 and the first roll 103. In this case, it becomes possible to supply the sheet-shaped member 201 from the first roll 103 through the first guide roll 107 to the unit 1, and therefore, a supply state of the sheet-shaped member 201 tends to keep stable. The first guide roll 107 may be made up of one roll or a plurality of rolls.

The cutting apparatus 101 may include a second guide roll 109 located between the unit 1 and the second roll 105. In this case, it becomes possible to supply the sheet processed product 203 from the unit 1 through the second guide roll 109 to the second roll 105, and therefore, a supply state of the sheet processed product 203 tends to keep stable. The second guide roll 109 may be made up of one roll or a plurality of rolls.

Although the cutting apparatus 101 includes the unit 1 in the non-limiting embodiment illustrated in FIG. 12, the cutting apparatus 101 is not limited to this embodiment. For example, the cutting apparatus 101 may include the unit 1A.

<Method for Manufacturing Sheet Processed Product>

A method for manufacturing a sheet processed product 203 in a non-limiting embodiment of the present disclosure is described in detail below with reference to FIG. 12 by exemplifying the case of using the cutting apparatus 101.

The sheet processed product 203 may be manufactured by cutting down the sheet-shape member 201 as in the non-limiting embodiment illustrated in FIG. 12. The method for manufacturing the sheet processed product 203 may include the following steps of:

(1) inserting the sheet-shaped member 201 between a plurality of first blades 25 and a plurality of second blades 27 in the unit 1 of the cutting apparatus 101; and (2) cutting down the sheet-shaped member 201 by the plurality of first blades 25 and the plurality of second blades 27.

If the cutting apparatus 101 including the unit 1 is used in the method for manufacturing the sheet processed product 203, poor cutting is less likely to occur. The sheet-shaped member 201 can be inserted between the first blades 25 and the second blades 27 in the unit 1 by rotation of the first roll 103.

Additionally, the sheet processed product 203 can be taken up on the second roll 105 by rotation of the second roll 105.

Examples of the sheet-shaped member 201 may include members, such as a metal foil, paper, and a resin film.

Although the cutting apparatus 101 including the unit 1 is used in the non-limiting embodiment illustrated in FIG. 12, there is no intention of limiting to this embodiment. For example, the cutting apparatus 101 including the unit 1A may be used.

The invention claimed is:

1. A unit comprising:

a base;

a first shaft that is attached to the base and extends along a first rotation axis;

a plurality of holders having a cylindrical shape which are attached to the first shaft;

a plurality of first blades having an annular shape which are respectively attached to the plurality of holders;

a second shaft that is attached to the base and extends along a second rotation axis parallel to the first rotation axis;

a plurality of second blades having a cylindrical shape which are attached to the second shaft; and a detection means for detecting contacts between the plurality of first blades and the plurality of second blades, wherein the first shaft, the second shaft, the first blades and the second blades individually have conductivity, the detection means comprises a power source, a first wiring electrically connecting the first shaft and the power source, a second wiring electrically connecting the second shaft and the power source, a plurality of light emitting devices respectively attached to the plurality of holders, a third wiring electrically connecting each of the plurality of light emitting devices and the first shaft, and a fourth wiring electrically connecting the plurality of light emitting devices and the plurality of first blades respectively.

2. The unit according to claim 1, wherein the holder comprises an outer circumferential surface, and the light emitting device is attached to the outer circumferential surface.

3. The unit according to claim 1, wherein the third wiring comprises a ball plunger contactable with the first shaft.

4. The unit according to claim 1, wherein the plurality of light emitting devices are arranged in a row along the first rotation axis.

5. The unit for the cutting apparatus according to claim 1, wherein the holder comprises an outer circumferential surface, and a concave part having an annular shape which is located on the outer circumferential surface, and the light emitting device is attached to the concave part.

6. The unit according to claim 5, further comprising:

a translucent member having an annular shape which is attached to the concave part and covers the light emitting device.

7. The unit according to claim 1, wherein the detection means comprises a switch.

8. The unit according to claim 1, wherein the plurality of light emitting devices individually comprises a first light emitting element, and a second light emitting element configured to emit light of a color different from that of the first light emitting element.

9. A cutting apparatus comprises:

the unit according to claim 1;

a first roll configured to permit winding of a sheet-shaped member therearound and feed the sheet-shaped member to the unit for the cutting apparatus; and a second roll configured to take up the sheet-shaped member cut down by the unit for the cutting apparatus.

* * * * *